United States Patent [19]

Hammond

[11] 4,081,910

[45] Apr. 4, 1978

[54] SHUT HEIGHT GAUGE AND METHOD OF USING SAME

[76] Inventor: H. Jack Hammond, 8004 Acme Way, Louisville, Ky. 40219

[21] Appl. No.: 687,988

[22] Filed: May 19, 1976

[51] Int. Cl.$^2$ .............................................. G01B 3/30
[52] U.S. Cl. .................................. 33/181 R; 425/170
[58] Field of Search ................. 33/181 R, 182, 184.5, 33/186; 425/170

[56] References Cited

U.S. PATENT DOCUMENTS

| | | | |
|---|---|---|---|
| 3,401,425 | 9/1968 | Fink | 425/170 |
| 3,559,247 | 2/1971 | Larsson | 425/170 |

Primary Examiner—Richard E. Aegerter
Assistant Examiner—Willis Little
Attorney, Agent, or Firm—Wood, Herron & Evans

[57] ABSTRACT

A gauge for setting the shut height of dies in a press including a body having a horizontal surface and a vertical surface, a dial indicator attached to the body having a plunger movable along a line parallel to the vertical surface, and a set bar having two surfaces parallel to the horizontal surface of the body and being receivable thereon with one of the two surfaces being vertically offset from the other a predetermined distance equaling the desired clearance between the end of the set block and the opposed die. With the dies separated, the set bar is placed on the body depressing the plunger and the gauge is mastered with the dial indicator being zeroed. The gauge is located on the set block with the one surface of the set bar contacting the end of the set block and the other vertically offset surface engaging and depressing the plunger. The set bar is removed releasing the plunger. The press slide is cycled to the bottom of the stroke and then moved toward the set block with the opposed die engaging and depressing the plunger until the dial indicator returns to zero. The die is thereby set with a gap between the end of the set block and the opposed die equaling the predetermined offset of the horizontal surfaces of the set bar.

11 Claims, 8 Drawing Figures

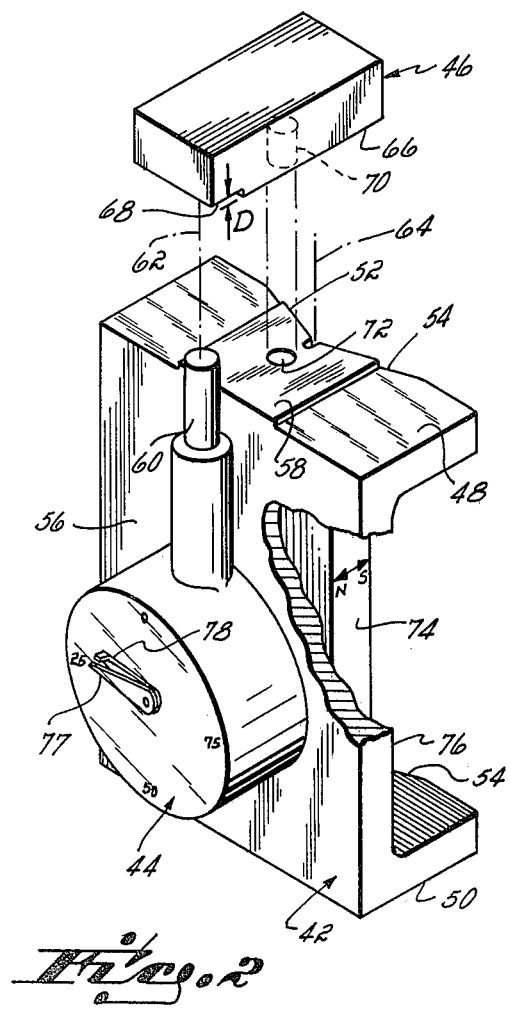
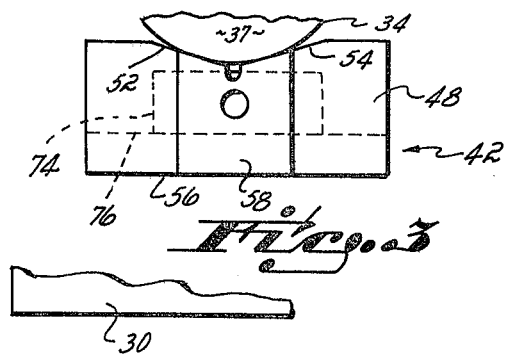
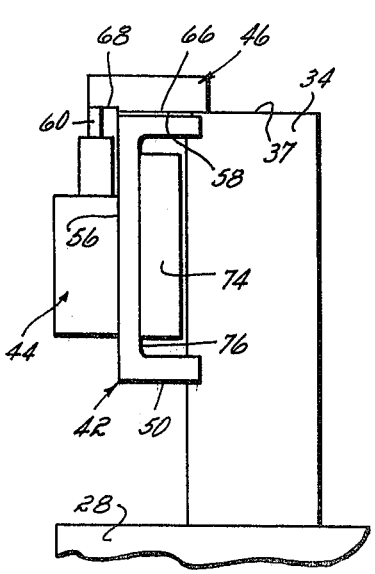
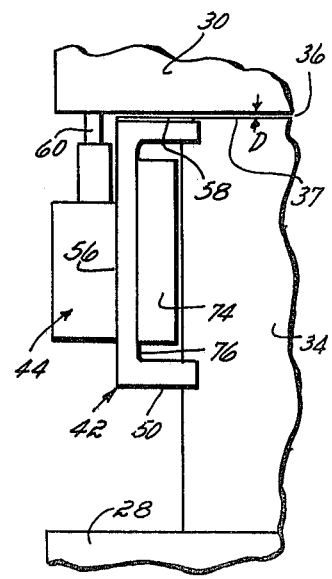
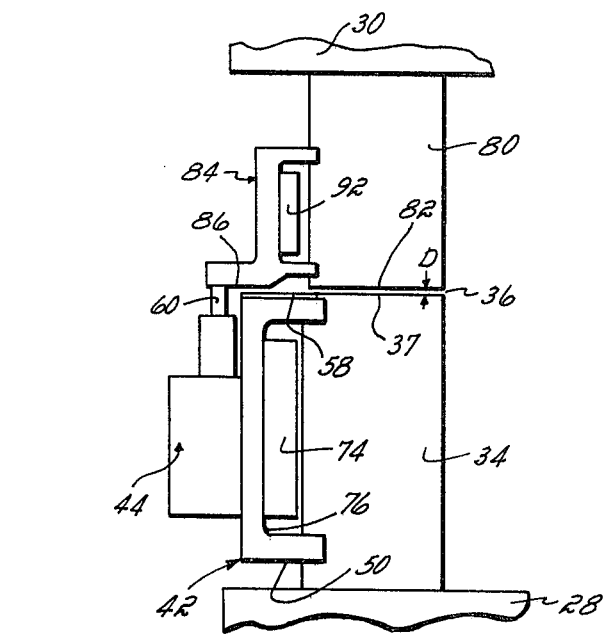
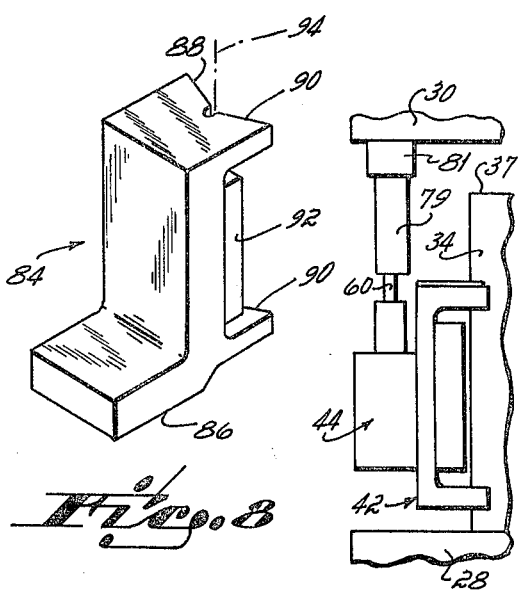

4,081,910

SHUT HEIGHT GAUGE AND METHOD OF USING SAME

BACKGROUND OF THE INVENTION

This invention relates to a method and apparatus for setting the shut height of dies in a press and, more particularly, to a gauge for setting the shut height of dies and the method for using the same.

Mechanical presses are used throughout industry in a variety of forming applications such as forming, piercing, drawing, blanking, bending, stamping and the like. Presses vary in size from just several ton capacity to up to hundreds of ton capacity and are typically large and expensive pieces of equipment. Parts are formed in the press by placing the workpiece between opposed dies mounted in the press and bringing the dies together by means of a reciprocable drive mechanism. The forming dies are formed from hardened tool steel and are accurately machined for precision forming of parts. They are of varying size and are also expensive items of equipment. Mechanical presses are made more versatile by providing the presses with adjustable slides on which one of dies is mounted for varying the distance between the slide and the press bed so that the press can accommodate dies of different shut heights.

Vertical misalignment of dies is a major cause of premature die wear and damage and overloading of presses. Accurate setup of the dies in the press is therefore of utmost importance. Moreover, it is occasionally necessary to realign the dies during operation to compensate for vertical backup of the press. For purposes of die setup, dies are provided with set blocks which are blocks of metal accurately machined such that when the press ram is at its bottom position and the dies are in their fully closed position with the workpiece therebetween there exists a small, predetermined distance between the end of the set block and the opposed die which defines the desired separation between the dies in their closed position. This distance is typically on the order of 0.010 inch.

Heretofore, dies have been setup by a number of methods. First, they have been setup by a visual approximation in which the setup man attempts to determine by sight the small gap between the end of the set block and the opposed die. Second, dies have been setup by the use of a thin piece of cardboard or paper not uncommonly of unknown thickness, being inserted between the end of the set block and the die with the die being brought together until the paper can just be pulled out. Third, dies have been setup by placing a small diameter deformable material on the end of the set block, for example, a piece of solder wire, lowering the die to flatten the wire, and periodically measuring the thickness of the flattened wire with a pair of calipers to arrive at an approximation of the required 0.010 inch clearance. Each of these methods falls far short of providing accurate setup of the dies. A fourth method, which may be referred to as a trial and error method, involves placing sample workpieces in the dies and operating the press with successively smaller clearances observing the degree of deformation of the workpieces while sensing the intensity of the sound and vibration of the press occurring during deformation to arrive at some approximation of the correct shut height. This method also is highly inaccurate but further results in damage to the dies and the press during the setup operation itself.

If the dies are set with too wide a gap, the parts are not correctly formed resulting in substantial waste of material. Since the dies themselves and the presses have some capacity to absorb shocks through distortion and deflection, it is common in practice for the die setup man to err toward placing too narrow a gap rather than too wide a gap between the set block and the die. It is not uncommon for the dies to be setup with no gap at all allowing the die and press to distort and deflect during operation. As a result, during press operation the set block is actually driven into the opposed die. This means that the set block must be made large to absorb the shocks. But moreover, this method results in greatly excessive wear of the dies and press parts, poor part quality, distortion, excessive noise, and hazards to press operators from breakage of the dies during press operation.

It is an object of this invention to provide a gauge and method of using same which allows for precise setup of dies in a press to achieve maximum part quality and maximum die and press life.

It is another object of this invention to eliminate inaccuracies, approximations, and trial and error in die setup and to establish accurate and consistent setting of the shut height of dies in presses.

It is another object of this invention to provide a gauge for the setting of the shut height of dies accurately to within 1/1,000 of an inch.

It is another object of this invention to provide a gauge for setting the shut height of dies which is simple in construction, easy to operate and permits fast setup of dies, light, compact, and versatile such that it may be moved from one press to another and may be used with all type of presses and all types of set blocks.

It is another object of this invention to provide a gauge which can detect vertical misalignment of dies which results in excessive die and press wear and damage thereby reducing costs and loss of production time resulting from the need for repair, reconditioning or replacement of dies and press parts.

It is another object of this invention to achieve precise setup of dies thereby reducing the hazards to press operators resulting from imprecise setup of the dies.

It is another object of this invention to provide a gauge that will detect if interferences exist in the dies.

SUMMARY OF THE INVENTION

These and other objects are accomplished by providing a gauge for setting the shut height of dies in presses including a body having at least one surface adapted to engage a vertical surface of the set block and an upper surface perpendicular thereto, a dial indicator attached to the body having a plunger movable along a line parallel to the set block engaging surface of the body and extending above the upper surface of the body, and a set bar receivable on the upper surface of the body. The set bar has a first surface substantially parallel to the upper surface adapted to engage the end of the set block and a second surface substantially parallel to the upper surface adapted to engage and depress the plunger when the set bar is in place. The second surface is offset from the first surface a distance equal to the desired clearance between the end of the set block and the opposed die which with the set block, die shoes and parallels defines the shut height of the dies.

In one embodiment, the gauge body has two surfaces lying in planes which intersect to form a V. The axis of the plunger is parallel to the line defined by the intersection of the two planes and extends above the upper surface. The two surfaces provide accurate alignment of the axis of the plunger with the vertical axis of a set block particularly with cylindrical set blocks. Further, the two surfaces are magnetized such that the gauge may be temporarily secured to the set block with the set block located in the V and, after setup, quickly released from the set block.

In operation, with the dies separated, the set bar is placed on the body with the offset surface engaging and depressing the plunger of the dial indicator, and the gauge is mastered at a zero position. The gauge is then placed on a vertical surface of the set block and moved vertically until the set bar engages the end of the set block. With the gauge in place and held on the set block, the set bar is removed releasing the plunger and allowing it to extend above the upper surface of the body. A preliminary adjustment of the press is made by cycling the press to the bottom of its stroke and lowering the slide until the plunger is slightly depressed. The slide is returned to the top of the stroke and cycled through a complete stroke with the slide engaging and depressing the indicator plunger at the bottom of the stroke and moving a maximum hand of the dial indicator from the zero position to a dial position indicating the exact bottom of the stroke. The slide is then cycled down to the recorded bottom of the stroke where the die engages and depresses the plunger. The slide is then lowered until the dial indicator and maximum hand return to zero. The die is now set with a precise, predetermined gap between the end of the set block and the opposed die. If bending, drawing or forming operations are performed, the forces of such operations can cause vertical backup of the press thus requiring a further adjustment. This adjustment is performed by cycling the press with material in the die. The exact amount of vertical backup will be recorded by the maximum hand on the dial indicator. The slide is then again moved down until the indicator needle moves to the position of the maximum hand. The slide is then further lowered until the dial indicator and the maximum hand return to zero.

Other objects and advantages of this invention will be apparent from the following detailed description, reference being had to the accompanying drawings.

BRIEF DESCRIPTION OF THE DRAWINGS

FIG. 2 is an exploded isometric view of the shut height gauge;

FIG. 3 is a top view of the gauge shown in FIG. 2 with the set bar removed;

FIG. 4 is a schematic elevational view of a portion of FIG. 1 showing the gauge at one step of the setup operation;

FIG. 5 is a schematic elevational view similar to FIG. 4 showing the gauge at another step of the setup operation;

FIG. 6 is a schematic elevational view showing the gauge at one step of the setup operation in another embodiment of the invention;

FIG. 7 is a schematic elevational view showing the gauge at one step of the setup operation in another embodiment of the invention; and FIG. 8 is an isometric view of a member used with the shut height gauge in the embodiment of the invention shown in FIG. 7.

DETAILED DESCRIPTION OF THE INVENTION

Figure 1:
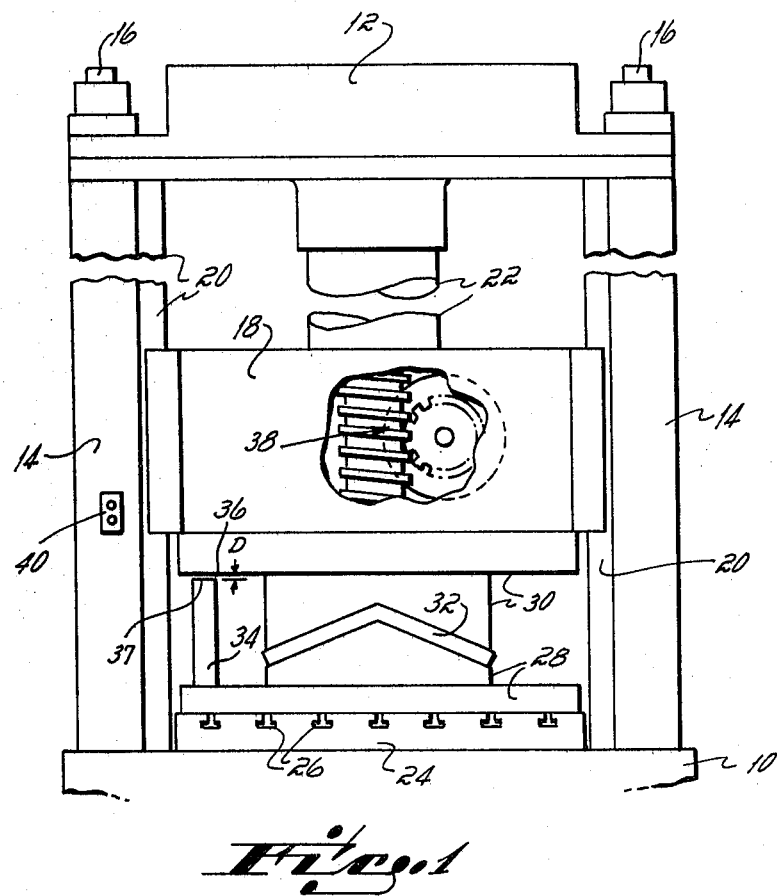
FIG. 1 is an elevational view with parts broken away of a press to which this invention is applicable.

Referring to FIG. 1, there is generally shown a press to which the invention is applicable. The press includes a base 10, a crown 12, vertical side members 14 extending therebetween, and tie rods 16 which pass through the side members 14 and are secured to the base 10 to hold the crown 12 in place. Within the crown 12, is an eccentric drive mechanism (not shown) which reciprocates a slide 18 on vertically disposed, parallel side rails 20 attached to the side members 14. The drive mechanism reciprocates the slide 18 by means of a main ram 22 attached to the slide 18 and operatively connected to the eccentric drive. Resting on and attached to the base 10 is a bolster 24. In the upper surface of the bolster 24 are a plurality of T-grooves 26 for receiving bolts (not shown) for clamping of a lower or stationary die member 28 thereon. Attached to the slide 18 is an upper or movable die member 30. The slide is vertically reciprocal such that at the bottom of the ram stroke the upper die member 30 engages a workpiece 32 with the force of the slide deforming the workpiece between the upper and lower die members 30 and 28, respectively.

The lower die 28 includes a set block 34. The set block is typically formed of cold rolled steel on the order of three inches in cross-section and is accurately machined such that in the die closed position with the workpiece therebetween, as shown in FIG. 1, there exists a gap 36 between the upper end 37 of the set block 34 and the upper die member 30. This gap is of predetermined distance D and is designed into the die pairs to set the precise distance between the dies in the die closed position when the dies are mounted in the press. The gap 37 is typically on the order of 0.010 inch.

The slide 18 is vertically adjustable on the ram 22 by means of a motor and gear drive 38 remotely operable by the setup person by means of control buttons 40 to raise or lower the slide 18 on the ram 22 and thereby vary the width of the gap 36. The use of an adjustable slide allows the press to accommodate dies of different shut heights. Small single point presses have a screw arrangement to provide this adjustment. In heavier presses, a gear drive makes it easier for the setup person to move the slide. As press size increases and the slide becomes massive, this gear drive is motorized. However, motorized slide adjustments are also used in many smaller presses.

Whenever a new die is placed in the press, it must be setup by adjusting the slide on the ram until the distance D between the upper die 30 and the end 37 of the set block 34 equals the predetermined clearance, e.g., 0.010 inch. Moreover, the slide must be readjusted on the ram if vertical backup of the press occurs.

Referring now to FIG. 2, the shut height gauge of the invention includes generally a body 42, a dial indicator 44 and a set bar 46. The body 42 is channel-shaped having top and bottom surfaces 48 and 50, respectively, two surfaces 52 and 54 lying in planes which intersect to form a V; and a plane face 56 perpendicular to surfaces 48 and 50. A portion of the top surface 48 is accurately machined to provide a surface 58 for receiving the set bar 46. Surface 58 is perpendicular to the surfaces 52 and 54 so that when the surfaces 52 and 54 engage the vertical surface of a set block 34, surface 58 will be horizontal. The dial indicator 44 is attached to the face 56 and includes a plunger 60 movable on an axis 62 parallel to the line 64 defined by the intersection of the planes in which surfaces 52 and 54 lie. The plunger extends above the horizontal surface 58 when the set bar 46 is removed from the gauge and is depressed downwardly from this extended position when the set bar is placed on the gauge body 42.

The set bar 46 is receivable on surface 58 and includes a first surface 66 and a second surface 68 parallel to each other and to surface 58. Like surface 58 of body 42, the surfaces 66 and 68 are accurately machined to be truly horizontal when placed on surface 58 of the body. The set bar 46 further includes a pin 70 receivable into a hole 72 in the surface 58 such that when the pin 70 is inserted into the hole 72 the set bar 46 engages the body 42 with the surfaces 66 and 58, respectively, being in contact. When the set bar 46 is moved into engagement with the body 42, surface 68 engages the plunger 60 and depresses it. Surface 68 is offset from the first surface 66 the distance D. This distance is predetermined and equals the width of the desired gap 36 between the upper end 37 of the set block 34 and the die 30 at the bottom of the ram stroke.

The gauge further includes a magnet 74 in the channel of body 42 attached to the inner surface 76 thereof by means of an adhesive. Magnet 74 is so oriented that its north pole, N, and south pole, S, lie in planes parallel to the face 56. With this orientation, the lines of magnetic flux pass through body 42 magnetizing it. The body 42 is adapted to be temporarily secured to a vertical surface of the set block 34 during the setup operation with surfaces 52 and 54 contacting the set block. Set blocks are typically formed of iron base alloys, and thus the magnetic force of the magnet 74 holds the body 42 on the set block 34. A magnetic force of 30 pounds has been found to be sufficient to hold the gauge in place from movement during the setup operation but yet not so great that the gauge cannot be easily removed by the setup man after the setup operation. The magnetic force also holds the set bar 46 on the body 42 and allows for its quick removal by the setup man. It will be recognized, however, that other forms of temporary attachment of the gauge to the set block may be employed such as either mechanical means, e.g., a chain attached to the gauge and circling the set block, or non-mechanical means, e.g., the use of an adhesive on the surfaces 52 and 54.

Referring to FIG. 3, the V configuration of surfaces 52 and 54 provides the gauge with great flexibility whereby it may be used on many different types and sizes of set blocks. It is particularly useful for cylindrical set blocks since the intersecting planes provide the body 42 with double line contact on the cylindrical surface of the set block thus accurately aligning the plunger axis 62 with the vertical axis of the set block. An angle of 150° between planes has been found to provide accurate alignment on many different surfaces thereby giving the gauge great flexibility.

The particular form of the dial indicator is not critical to the invention. That shown in FIG. 2 is calibrated in thousandths of an inch and is designed such that when the surfaces 66 and 58 are in engagement and the plunger 60 depressed by surface 68, the gauge is mastered with the indicator needle 77 pointing to zero. When the set bar 46 is removed and the plunger released, the needle 77 moves away from the zero point indicating some other numerical value on the dial face. The dial indicator shown in FIG. 2 further includes a maximum hand 78 engageable and movable by the indicator needle 77 such that on rotation of needle 77 the hand 78 is moved by the needle 77 to a position recording the maximum rotation of the needle 77. When the dies are properly set, as hereinafter described, the needle 77 and maximum hand 78 move back to the zero point. Alternatively, the dial face could be manually rotatable with respect to the indicator body and needle such that the face could be moved to align a predetermined numeral or mark on the face with the needle when the plunger is depressed by the set bar. Or a simple micrometer dial could be employed wherein the needle begins at zero when the plunger is fully extended and moves to some numerical value when the set bar engages the set block with the setup operator observing that numerical value. Thus any form of indicator or dial face which allows for setting or noting an indicator position when the set bar is in place on the gauge body may be used. As used herein, the terms "mastering" and "zeroing" of the dial indicator refers to marking or otherwise noting the position of the indicator needle with the set bar is in its engaged position on the gauge body.

Operation

In operation, the set bar 46 is placed on the gauge body 42 with the first surface 66 engaging surface 58 and the second surface 68 engaging and depressing the plunger 60. A portion of surface 66 extends out over the gauge body in the direction of the V. The dial indicator 44 is then mastered to zero. The gauge is then placed on a vertical surface of the set block 34 with the first surface 66 of the set bar 46 extending over the V engaging the upper end 37 of the set block 34, as shown in FIG. 4. The gauge is now in position on the set block and the set bar 46 is removed releasing the plunger 60. The ram is moved to the bottom of its stroke. Then either manually or by use of the ram adjusting motor, the slide is lowered until the upper die 30 makes contact with the plunger 60 of the dial indicator 44. The slide is returned to the top of the stroke, and the press is again cycled through a stroke allowing the upper die shoe to depress the dial indicator plunger causing the indicator needle to move the maximum hand to a dial position indicating the exact bottom of the stroke. The slide is then positioned at the exact bottom of the stroke by jogging the press until the indicator needle moves to the position of the maximum hand which has recorded the bottom of the ram stroke to within 1/1,000 of an inch. Thereafter, the slide is lowered by means of the ram adjusting motor until the upper die 30 depresses the plunger to the point at which needle and maximum hand return to the zero position, as shown in FIG. 5. The die is now set with an exact gap 36 between the top 37 of the set block 34 and the opposed die 30 equaling the predetermined distance D. A workpiece is then placed in the press with the gauge remaining on the set block and a sample stroke taken. If there is any variation in the indicator resulting from pressures causing the ram to backup vertically, an additional adjustment of the slide can be quickly noted by the maximum hand and easily made. The gauge is then removed.

Many dies include stripper springs which compress during the forming stroke and expand thereafter to strip the workpiece from the die. Whenever the ram adjusting motor does not have sufficient capacity to overcome the air pin or dies spring pressures, the die may be setup by using an extension 79, as shown in FIG. 6, which is a rod having a magnet 81 at the end thereof for temporarily securing the extension to the bottom of the opposed die 30 with the extension 79 being perpendicular to the horizontal surface of the die 30 and vertically aligned with the plunger 60 of the gauge 42. In such cases, the set bar is placed on the gauge body, the dial indicator is zeroed, and the gauge is placed on the set block in the same manner as previously described. It is then necessary to determine the exact bottom of the ram stroke as previously described.

Since the ram adjusting motor is not strong enough to overcome the force of the springs, the gauge must be moved to a new location. The gauge is moved down the set block 34, and the opposed die 30 is lowered to a position just prior to making contact with the air or spring pads. The extension 79 is placed on the horizontal surface of the die 30 and the body of the gauge is then moved upwardly with the extension depressing the plunger (FIG. 6). This upward movement is continued until the indicator needle returns to the position of the maximum hand. The slide is then lowered by means of the ram adjusting motor until the indicator needle and maximum hand return to zero. The die is now set to the proper shut height.

When material is progressed through the die, the forces required to draw or to form the material may back the ram up vertically. The amount the ram is raised vertically depends upon the amount of pressure and the clearance in the ram's movable parts. Press deflection can also enter into the indicator's reading. The amount of vertical backup is recorded by the maximum hand and the slide is then adjusted as previously described in relation to FIG. 6. The dies are now set to the proper shut height and the amount of backup which occurs during operation has been compensated for.

Occasionally, dies are made with two set blocks one above another. In such dies there is a bottom set block 34, as previously described, and a set block 80 extending down from the upper die 30 (FIG. 7). In this case, the gap 36 to be set is between the ends of the two set blocks 37 and 82, respectively, rather than between the end 37 of the bottom set block 34 and its opposed die 30. In this case, as shown in FIG. 7, the gauge is placed on the bottom set block 34 in the same manner as previously described and shown in FIG. 4, and the set bar is removed. An L-shaped member 84 (FIG. 8) is provided having a surface 86 accurately machined to be truly horizontal when the member is placed on a vertical surface of the set block 80, two surfaces 88 and 90 lying in planes perpendicular to surface 86 which intersect to form a V, and a magnet 92 attached to the member 84 in the same manner as magnet 74 is attached to the gauge body 42. The V-groove is similar to and serves the same purpose as that described in relation to gauge body 42 allowing member 84 to magnetically engage the set block 80 with the line of intersection 94 of the planes in which surfaces 88 and 90 lie being parallel to the vertical axis of the set block 80 whereby surface 86 is perpendicular thereto. The member 84 is placed on the set block in axial alignment with the plunger 60 and is slid down until surface 86 of member 84 is in horizontal alignment with the end 82 of the set block 80. With the ram at its exact bottom position as determined in the manner previously described in relation to FIGS. 4 and 5, the slide is now lowered by means of the ram adjusting motor with the horizontal surface 86 of the L-shaped member 84 contacting and depressing the plunger 60 of the dial indicator 44 until the indicator and maximum hand return to zero. Again, the precise gap D will be set.

This invention also will readily detect if interferences exist in the dies since on setup of the dies in the manner of any of the embodiments described above, any interference in the dies will prevent the dial indicator from returning to its zeroed position thus making it impossible to set the die to its proper shut height.

Although the invention has been described in terms of certain preferred embodiments it is to be understood that other forms may be adopted within the scope of the invention. Particularly, although the invention has been described in terms of presses, it is to be understood that the gauge and method of using same is equally applicable to any machinery having a reciprocating member whose strokes can be adjusted.

Thus having described the invention, what is claimed is:

1. A shut height gauge comprising, in combination,
   a body having at least one apparatus engaging surface and a surface perpendicular thereto,
   an indicator mounted on said body and including a plunger substantially parallel to said apparatus engaging surface and extending beyond the plane of said perpendicular surface, and
   a set bar for mastering said indicator receivable on said perpendicular surface, said set bar having first and second surfaces substantially parallel to said perpendicular surface, said second surface being offset a predetermined distance from said first surface, said first surface contacting said perpendicular surface and said plunger contacting said second surface when said set bar is received on said perpendicuar surface.

2. Claim 1 wherein at least said apparatus engaging surface is magnetized.

3. A shut height gauge comprising, in combination,
   a body having two apparatus engaging surfaces lying in planes which intersect to form a V and a surface perpendicular thereto,
   an indicator mounted on said body remote from said V including a plunger whose axis is substantially parallel to the line defined by the intersection of said planes and which extends beyond the plane of said perpendicular surface, and
   a set bar for mastering said indicator receivable on said perpendicular surface, said set bar having first and second surfaces substantially parallel to said perpendicular surface, said second surface being offset a predetermined distance from said first surface, said first surface contacting said perpendicular surface and said plunger contacting said second surface when said set bar is received on said perpendicular surface.

4. Claim 3 further comprising means for temporarily securing said body to a set block with said set block located in said V.

5. Claim 4 wherein said means for temporarily securing said body to a set block are magnetic.

6. A gauge for setting the shut height of a pair of opposed dies in a press, at least one of said dies including a set block, said gauge comprising, in combination,
   a body having at least one vertical surface adapted to engage a vertical surface of said set block and a horizontal surface,
   a dial indicator attached to said body including a plunger substantially parallel to said vertical surface and extending beyond said horizontal surface, and a set bar having a first surface receivable on said horizontal surface for mastering said indicator and for locating said gauge on said set block, said first surface extending beyond said vertical surface to engage the end of said set block, and a second surface substantially parallel to said horizontal surface adapted to engage said plunger, said second surface being vertically offset from said first surface a distance equal to the desired clearance between the end of said set block and its opposed die.

7. A gauge for setting the shut height of a pair of opposed dies in a press, at least one of said dies including a set block, said gauge comprising, in combination,
  a body having two set block engaging surfaces lying in planes which intersect to form a V and a surface perpendicular thereto,
  a dial indicator attached to said body remote from said V including a plunger whose axis is substantially parallel to the line defined by the intersection of said planes and which extends beyond said perpendicular surface, and
  a set bar having a first surface receivable on said perpendicular surface for mastering said indicator and for locating said gauge on said set block, said first surface extending beyond the intersection of said set block engaging surfaces to engage the end of said set block, and a second surface substantially parallel to said perpendicular surface adapted to engage said plunger, said second surface being offset from said first surface a distance equal to the desired clearance between end of said set block and its opposed die.

8. A gauge for setting the shut height of a pair of dies in a press, at least one of said dies including a set block, said gauge comprising, in combination,
  a channel-shaped body including inner and outer vertical plane surfaces, a horizontal surface, and two surfaces lying in vertical planes which intersect to form a V, said two surfaces being adapted to engage a vertical surface of said set block,
  a dial indicator fixed to said outer plane surface remote from said V including a plunger reciprocable on an axis substantially parallel to the line defined by the intersection of said planes and which extends beyond the plane of said horizontal surface,
  means attached to said body such that said two surfaces are magnetically attractable to said set block, and
  a set bar having a first surface receivable on said horizontal surface for mastering said indicator and for locating said gauge on said set block, said first surface extending beyond the intersection of said two surfaces forming said V to engage the end of said set block, and a second surface substantially parallel to said horizontal surface adapted to engage said plunger, said second surface being vertically offset from said first surface a distance equal to the desired clearance between end of said set block and its opposed die.

9. A gauge for setting the shut height of a pair of opposed dies in a press, said dies including opposed set blocks, said gauge comprising, in combination,
  a body having at least one vertical surface adapted to engage a vertical surface of one of said set blocks and a horizontal surface,
  a dial indicator attached to said body including a plunger substantially parallel to said vertical surface and extending beyond said horizontal surface,
  a set bar having a first surface receivable on said horizontal surface for mastering said indicator and for locating said gauge on said set block, said first surface extending beyond said vertical surface to engage the end of said one of said set blocks, and a second surface substantially parallel to said horizontal surface adapted to engage said plunger, said second surface being vertically offset from said first surface a distance equal to the desired clearance between ends of said set blocks, and
  a member having at least one vertical surface adapted to engage a vertical surface of the other of said set blocks in vertical alignment with said plunger and a horizontal surface adapted to be horizontally aligned with the end of the other of said set blocks and to engage and depress said plunger when said set bar is removed from said body.

10. A method of setting the shut height of a pair of opposed dies in a press, at least one of said dies including a set block, said method comprising the steps of:
  providing a gauge including a body having at least one set block engaging surface and a surface perpendicular thereto, an indicator including a plunger substantially parallel to said set block engaging surface and extending beyond said perpendicular surface, and a set bar receivable on said perpendicular surface, said set bar having first and second surfaces substantially parallel to said perpendicular surface, said second surface being offset from said first surface a distance equal to the desired clearance between the end of said set block and its opposed die,
  placing said set bar on said perpendicular surface with said second surface of said set bar engaging said plunger,
  zeroing said indicator,
  temporarily securing said gauge to said set block with said first surface of said set bar engaging the end of said set block,
  removing said set bar from said gauge, and
  adjusting said opposed die to a position where said plunger is engaged and said indicator is zeroed thereby setting the die to its proper shut height.

11. A method of setting the shut height of a pair of opposed dies in a press, at least one of said dies including a set block, said method comprising the steps of:
  providing a gauge including a body having at least one vertical surface adapted to engage a vertical surface of said set block and a horizontal surface, a dial indicator attached to said body including a plunger substantially parallel to said vertical surface and extending beyond said horizontal surface and a set bar receivable on said horizontal surface, said set bar having first and second surfaces substantially parallel to said horizontal surface, said second surface being vertically offset from said first surface a distance equal to the desired clearance between the end of said set block and its opposed die,
  placing said set bar on said horizontal surface with said second surface engaging said plunger,
  zeroing said dial indicator,
  temporarily securing said gauge to said set block with said first surface of said set bar engaging the end of said set block,
  removing said set bar from said gauge, and
  adjusting said opposed die to a position where said plunger is engaged and said indicator is zeroed thereby setting the die to its proper shut height.

* * * * *

UNITED STATES PATENT AND TRADEMARK OFFICE
CERTIFICATE OF CORRECTION

PATENT NO. : 4,081,910
DATED : April 4, 1978
INVENTOR(S) : H. Jack Hammond

It is certified that error appears in the above—identified patent and that said Letters Patent are hereby corrected as shown below:

In column 6, line 20, "with" should be --when--.

Signed and Sealed this

Twenty-second Day of August 1978

[SEAL]

Attest:

RUTH C. MASON
Attesting Officer

DONALD W. BANNER
Commissioner of Patents and Trademarks